United States Patent
Mallampalli et al.

(10) Patent No.: US 11,093,911 B2
(45) Date of Patent: Aug. 17, 2021

(54) SYSTEMS, METHODS, AND COMPUTER PROGRAM PRODUCTS PROVIDING AN IDENTITY-STORING BROWSER

(71) Applicant: PAYPAL, INC., San Jose, CA (US)

(72) Inventors: Phanendra Mallampalli, Leander, TX (US); Sriram Ramakrishnan, Austin, TX (US); Frank Anthony Nuzzi, Pflugersville, TX (US)

(73) Assignee: PAYPAL, INC., San Jose, CA (US)

( * ) Notice: Subject to any disclaimer, the term of this patent is extended or adjusted under 35 U.S.C. 154(b) by 244 days.

(21) Appl. No.: 16/146,283

(22) Filed: Sep. 28, 2018

(65) Prior Publication Data
US 2020/0104810 A1 Apr. 2, 2020

(51) Int. Cl.
| | |
|---|---|
| G06Q 20/40 | (2012.01) |
| G06Q 30/02 | (2012.01) |
| G06Q 20/32 | (2012.01) |
| G06Q 20/34 | (2012.01) |
| G06Q 20/38 | (2012.01) |
| G06Q 20/08 | (2012.01) |
| H04L 9/06 | (2006.01) |

(52) U.S. Cl.
CPC ....... *G06Q 20/0855* (2013.01); *G06Q 20/389* (2013.01); *G06Q 20/4012* (2013.01); *G06Q 20/40145* (2013.01); *H04L 9/0637* (2013.01)

(58) Field of Classification Search
CPC ................. G06Q 20/00–425; H04L 9/00–38
See application file for complete search history.

(56) References Cited

U.S. PATENT DOCUMENTS

| | | | | |
|---|---|---|---|---|
| 9,324,098 | B1 * | 4/2016 | Agrawal | G06Q 20/02 |
| 9,628,585 | B2 * | 4/2017 | Gong | H04L 63/166 |
| 2003/0028481 | A1 * | 2/2003 | Flitcroft | G07F 19/00 |
| | | | | 705/39 |
| 2011/0126024 | A1 | 5/2011 | Beatson et al. | |
| 2015/0112864 | A1 * | 4/2015 | Wallaja | G06Q 20/384 |
| | | | | 705/44 |
| 2016/0028699 | A1 | 1/2016 | Ambroz et al. | |
| 2017/0046651 | A1 | 2/2017 | Lin et al. | |
| 2018/0025442 | A1 * | 1/2018 | Isaacson | G06Q 30/0633 |
| | | | | 705/26.62 |
| 2018/0150630 | A1 * | 5/2018 | Pike | G06Q 20/40145 |
| 2018/0255090 | A1 * | 9/2018 | Kozloski | H04L 67/02 |
| 2020/0019545 | A1 * | 1/2020 | Ye | G06Q 10/0631 |

* cited by examiner

*Primary Examiner* — John W Hayes
*Assistant Examiner* — Chenyuh Kuo
(74) *Attorney, Agent, or Firm* — Haynes and Boone, LLP (57) ABSTRACT

A method includes: communicating data from a browser, operating on a computing device, to an electronic shopping cart during a transaction; receiving user-authenticating data from a user interface of the computing device; decrypting secure user data stored to the computing device; authenticating a user based on the user-authenticating data and the decrypted secure user data; in response to authenticating the user, transmitting an indication of payment from the browser to the electronic shopping cart; processing the transaction after transmitting the indication of payment; and recording the transaction in a blockchain stored on the computing device.

15 Claims, 7 Drawing Sheets

SYSTEMS, METHODS, AND COMPUTER PROGRAM PRODUCTS PROVIDING AN IDENTITY-STORING BROWSER

BACKGROUND

Field of the Invention

The present disclosure generally relates to Internet browsers and, more specifically, to browsers configured to store identity information of a user in a blockchain and to authenticate a user.

Related Art

More and more consumers are purchasing items and services and/or otherwise conducting transactions over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile transaction service provider such as, for example, PayPal, Inc. of San Jose, Calif. Such electronic transaction service providers can make transactions easier and safer for the parties involved. Conducting transactions from the convenience of virtually anywhere using a mobile device is one main reason why on-line and mobile transactions are growing very quickly.

Nevertheless, online and mobile transactions may in some instances be subject to a heightened risk of fraud. From the consumer's standpoint, a user may desire not to divulge her personal and financial information to a multitude of merchants online. For instance, one of the merchants may be breached, thereby spreading the consumer's personal and financial information to illegal marketplaces. From the standpoint of a merchant, it may be difficult to verify that the consumer on the other end of the transaction correctly identifies herself and is not committing fraud. When funding cards are used to complete the transaction, the merchant may be liable for fraud losses, thereby providing motivation for the merchant to at least make an attempt to minimize fraud. Such problems are a result of the use of computing devices and computer networks that enable sensitive user data to be communicated and stored electronically, resulting in increased chances of misappropriation of such data.

It would be desirable to have a technological solution that may provide security for both the merchant and the consumer, by protecting consumer information and providing some assurance to the merchant that the user is legitimate.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Various embodiments provide for an Internet browser that securely stores personal and financial information of a consumer, authenticates the consumer, and verifies the legitimacy of a transaction to a merchant or other entity.

In one example, a browser is configured so that it encrypts and stores secure user data, such as consumer identity and financial information, to a mobile device or other computer device. The browser may use encryption that is based on security information from the consumer or about the consumer, such as a personal identification number (PIN), a password, biometric information, and/or the like. In fact, the browser may use a weaker level of encryption (e.g., only a PIN) for less sensitive information such as a name, but may use a stronger level of encryption (e.g., a PIN plus biometric information) for more sensitive information such as date of birth and bank account numbers.

Continuing with the example, the consumer may authorize a transaction by submitting the security information. For instance, if the consumer desires to make a purchase with a merchant, the browser may prompt the consumer to enter a PIN and scan a fingerprint. Once the PIN and the fingerprint data are input, the browser may use that information to decrypt the stored identity and financial information. The browser may confirm that the security information properly decrypts the consumer's identity and financial information before allowing a transaction with the merchant to proceed, thereby providing an authorization step. The encryption protects the information as it is stored, and the authorization works to identify the consumer and to ensure that malicious actors are denied access to transactions.

Further in this example, the browser may be linked to an electronic shopping cart through a legal (e.g., contractual) relationship and also through a technical relationship so that the browser and shopping cart share application programming interfaces (APIs) and authentication mechanisms. Thus, when the browser initiates a transaction with the shopping cart, the shopping cart is aware that it is being contacted by a particular type of browser that is associated with a certain level of security and user authentication.

In one example use case, a consumer desires to purchase an item from an e-commerce website. The user selects the item and then proceeds to the shopping cart. The shopping cart itself is a legal entity that is associated with the merchant's e-commerce website. The shopping cart may receive information from the merchant website indicating the particular item to be purchased. When the user desires to check out, in response, the browser may provide a prompt for the user to enter user-authenticating data (e.g., PIN and fingerprint) at a user interface of the user's mobile device. The browser receives user-authenticating data and decrypts the secure user data that is stored to the user's mobile device to authenticate the user. In response to authenticating the user, the browser transmits an indication of payment from the browser to the electronic shopping cart. An example of an indication of payment may be a token or a message that indicates that payment will be forthcoming according to a previously-agreed-upon relationship. The browser may then process the transaction by, e.g., causing payment to be made from an issuing bank of the consumer to an acquiring bank of the merchant. The browser may then store the transaction in a blockchain or other secure ledger to the computing device.

Further continuing with the example, the browser may implement one or more blockchains to safely store information and to provide a way to audit the transactions for the various interested parties (e.g., the consumer, the merchant, the shopping cart, etc.). In one example, the user's personal and financial information is stored to a block of the blockchain in its encrypted form and subsequent transactions are recorded in subsequent blocks of the blockchain, where a block for a particular transaction may be signed by one or more of the interested parties according to system-generated keys. Therefore, users of the system may access the blockchain to verify that a transaction did or did not occur, and the browser itself may use the information in the blockchain for processing payment of various transactions. Furthermore, pending transactions and/or merchant-customer interaction (until transaction is actually done) may be implemented in side chains until the transaction is complete, in which case a respective side chain may be made part of the primary chain.

In one aspect, an example browser according to one embodiment may act as three things: 1) a secure vault that stores the consumer's financial and payment information, 2) a payment provider, so that the customer can go to a shopping cart and submit payment without having to select a payment method or submit any other payment information, and 3) a wallet storing a list of transactions and a list of who has accessed the information. In another aspect, the browser integrates with a shopping cart that is a separate entity from the merchant. In such examples, there would be little or no integration effort on the part of the merchants. In embodiments employing a blockchain-based browser, the transactions and accesses may be recorded in the blockchain, thereby providing transparency to interested parties. For instance, a consumer may access a list of her transactions and view who accessed the information and revoke/invoke access to parties involved from the browser. Furthermore, various blockchain-based embodiments may include a permissioned blockchain, where various interested parties may add to the chain, but parties not already in the system may be excluded from being able to access the blockchain.

Various embodiments may provide one or more advantages over other browsers. For instance, some embodiments described herein may provide for increased security of user data by encrypting the data, while allowing the data to be accessed in response to entry of user-authenticating data. Also, various embodiments are associated with a shopping cart and provide that shopping cart with assurance that the user on the other end is legitimate. Such features may provide for increased security and lower risk for electronic transactions. Additionally, some embodiments may store data in a blockchain, which allows interested parties to audit transactions, thereby further increasing electronic data security.

Figure 1:
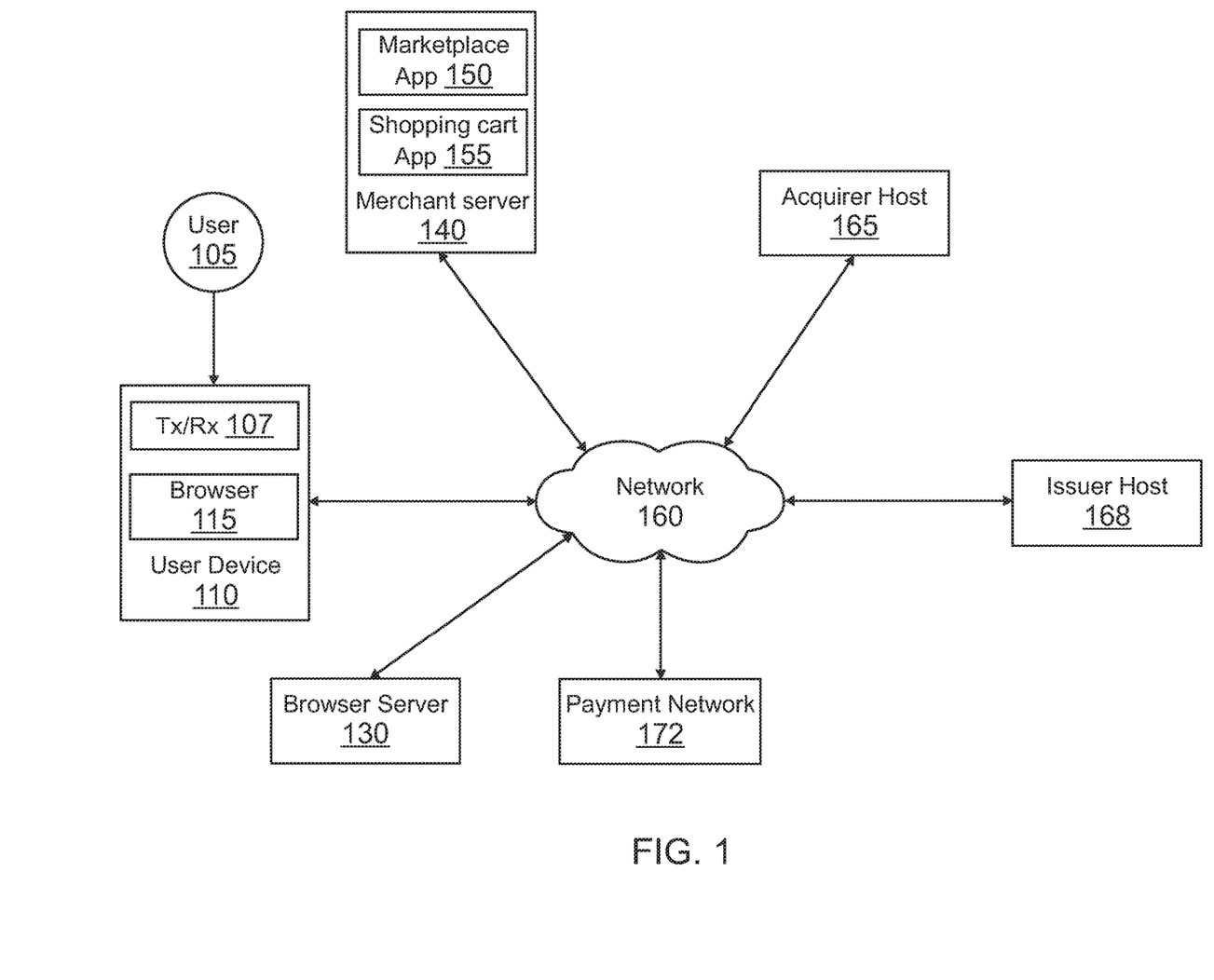
FIG. 1 is block diagram of a networked system suitable for use with an identity-storing browser according to an embodiment.

FIG. 1 is a block diagram of a networked system suitable for implementing an identity-storing browser according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a browser server 130, a merchant server 140, an acquirer host 165, an issuer host 168, and a payment network 172 in communication over a network 160.

User device 110, browser server 130, merchant server 140, acquirer host 165, issuer host 168, and payment network 172 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart watch, a smart phone, a smart phone with additional hardware such as NFC chips, BLE hardware etc., wearable devices with similar hardware configurations such as a gaming device, a virtual reality headset, or that talk to a smart phone with unique hardware configurations and running appropriate software, laptop computer, and/or other types of computing devices capable of transmitting and/or receiving data, such as an iPad™ from Apple™.

User device 110 may include a transceiver 107. User device 110 employs transceiver 107 to communicate with network 160 and with merchant server 140, acquirer host 165, issuer host 168, and payment network 172. User device 110 may communicate with merchant server 140, acquirer host 165, issuer host 168, and payment network 172 either via network 160 or via other means (e.g., directly by Bluetooth or NFC). Examples of communication between user device 110 and other computer systems as described in more detail below at FIG. 5.

User device 110 may include a browser client application 115 which may be used, for example, to provide a convenient interface to permit a human user 105 to browse information available over network 160. For example, in one embodiment, browser client application 115 may be implemented as a web browser configured to view information available over the Internet, such as a user account for online shopping and/or merchant sites for viewing and purchasing goods and services. In this example, browser client application 115 is configured to work with browser server 130 as an identity-storing browser and is described in more detail with respect to FIG. 2. In short, browser client application 115 in this example is configured work with browser server 130 to encrypt and store user identity and financial information, decrypt user identity and financial information in response to user-authenticating data of the user 105, and communicate with applications at merchant server 140, shopping cart 155, acquirer host 165, issuer host 168, and payment network 172 to facilitate a transaction and make payment as appropriate. This is described in more detail below.

User device 110 also may include other applications to perform functions, such as email, texting, voice and IM applications that allow user 105 to send and receive emails, calls, and texts through network 160, as well as applications that enable the user 105 to communicate, transfer information, and make payments.

Browser server 130 may be implemented as a server application running on a computer, such as a commodity server running an operating system such as Linux, a laptop computer, or the like. Browser server 130 is described in more detail with respect to FIG. 2. Collectively, browser client application 115 and browser server 130 may be referred to as "browser 115, 130."

Merchant server 140 may be maintained, for example, by a merchant or seller offering various products and/or services. The merchant may have a physical point-of-sale (POS) store front. Merchant server 140 may be used for POS and online purchases and transactions. Generally, merchant server 140 may be maintained by anyone or any entity that receives money, which includes charities as well as retailers and restaurants. For example, a purchase transaction may be payment or gift to an individual. Merchant server 140 may include a database identifying available products and/or services (e.g., collectively referred to as items) which may be made available for viewing and purchase by user 105. Accordingly, merchant server 140 also may include a marketplace application 150 which may be configured to serve information over network 160 to browser client application 115 of user device 110 and browser server 130. In one embodiment, human user 105 may interact with marketplace application 150 through browser applications over network 160 to view various products, food items, or services identified in the database. For instance, the marketplace application 150 may include a website that is presented externally over network 160 to browser 115, 130 using HTTP or other appropriate protocols.

Merchant server 140 also may include a shopping cart application 155 which may be configured to facilitate the purchase by user 105 of goods or services online or at a physical POS or store front. Shopping cart application 155 may be configured to accept payment information from or on behalf of user 105 by passing a payment request to acquirer host 165 (and on to issuer host 168 and payment network 172) over network 160. Checkout application 155 may be configured to receive payment via a plurality of payment methods including cash, credit cards, debit cards, checks, money orders, or the like.

In this example, the shopping cart 155 is an application that is associated with a legal entity that is separate from the merchant server 140 and the browser 115, 130, and it has a pre-established contractual and technical relationship with merchant server 140 and browser 115, 130. As described above, the shopping cart application 155 may receive payment from user 105 by passing a payment request to acquirer host 165 and in response to receiving payment credentials from user 105. However, in this example embodiment, the shopping cart 155 and browser 115, 130 agree on protocols to allow the user 105 to pay for a purchase without having to directly enter payment information or, in some examples, without having to transmit user account data from the browser 115, 130 to the shopping cart application 155. For instance, a user may simply click a payment button either before or after having authenticated herself by the browser 115, 130. The contractual relationship between the browser 115, 130 and the shopping cart application 155 ensures payment, while reducing transfer of secure user data, at least between the shopping cart application 155 and browser 115, 130.

Payment network 172 may be operated by payment card service providers or card associations, such as DISCOVER, VISA, MASTERCARD, AMERICAN EXPRESS, RuPAY, China Union Pay, etc. The payment card service providers may provide services, standards, rules, and/or policies for issuing various payment cards. A network of communication devices, servers, and the like also may be established to relay payment related information among the different parties of a payment transaction.

Issuer host 168 may include a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at various merchants who agreed to accept the payment card. In the present example, information about a payment card, such as account number, security code, and expiration date, may be stored securely by browser 115, 130. For instance, user 105 may enter such information using a graphical user interface of the browser 115, 130.

Acquirer host 165 may include a server operated by an acquiring bank. An acquiring bank may include a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

In various embodiments, browser 115, 130 may submit payment information to the acquirer host 165 on behalf of user 105 or merchant server 140. For instance, browser 115, 130 may provide an indication of payment to the shopping cart application 155, thereby promising payment to the shopping cart application and to the merchant, but without directly providing user account numbers to the merchant server 140. At that time or later, the browser 115, 130 may then cause payment to be made by sending a message to the acquirer host 165, where the message includes the transaction information as well as user account information, thereby causing payment to be made from the issuer host 168 to the merchant.

Figure 2:
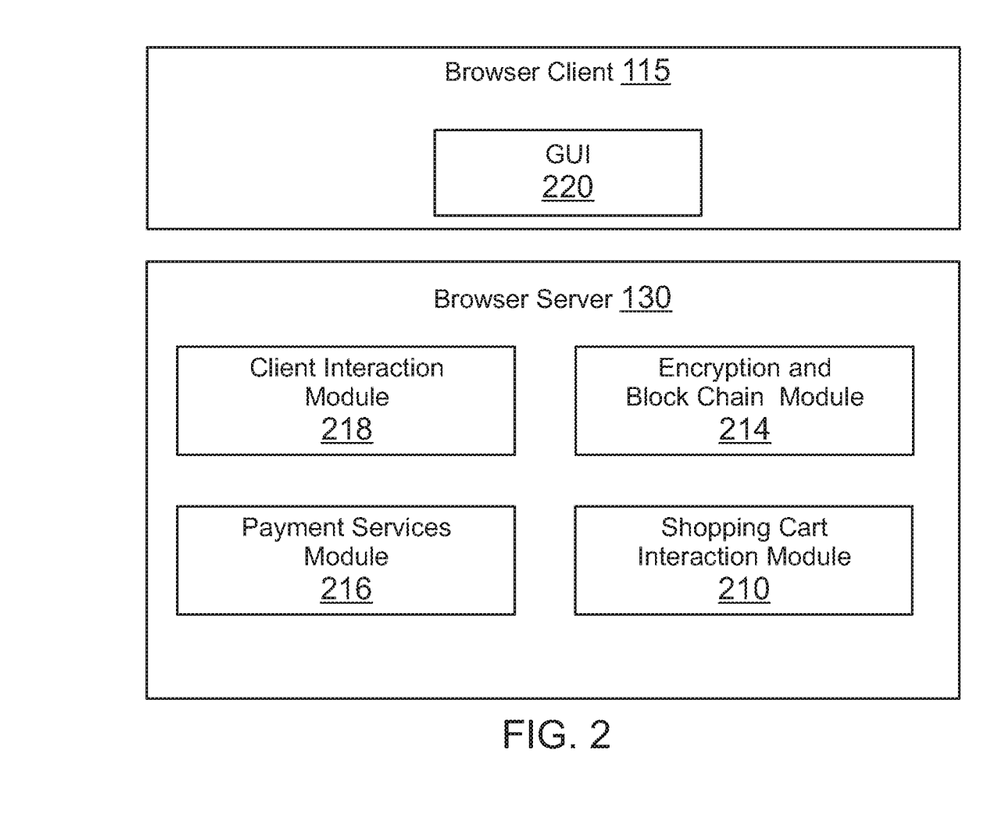
FIG. 2 is an illustration of the example identity storing browser of FIG. 1, with more detail, according to one embodiment.

FIG. 2 is an illustration of an example identity-storing browser 115, 130 according to one embodiment. In this example, browser client application 115 includes graphical user interface (GUI) 220 to interact with a user 105. Browser server 130 includes shopping cart interaction module 210, an encryption and blockchain module 214, payment services module 216, and client interaction module 218. Browser client application 115 communicates with browser server 130 through one or more agreed-upon protocols, including messages and/or APIs to provide the functionality described herein. Browser server 130 includes client interaction module 218 specifically to communicate with browser client application 115. In one example, as the user 105 makes selections using GUI 220, browser client application 115 may communicate with browser server 130 to indicate selections made (e.g., an intent to make a purchase), and browser server 130 may send messages back to browser client application 115 (e.g., to cause GUI 222 display a prompt to enter a PIN and biometric data). This is explained further in the example below.

As noted above, browser 115, 130 has a contractual and technical relationship with shopping cart application 155. shopping cart interaction module 210 in this example conforms to the contractual and technical relationship by using agreed-upon APIs and messages to interface with the shopping cart application 155, thereby identifying browser 115, 130 as a known browser. For instance, when beginning a transaction, shopping cart interaction module 210 may perform a protocol-based handshake operation with shopping cart application 155, thereby beginning the transaction as well as authenticating the browser 115, 130 to the shopping cart application 155 (and vice versa).

In one example use case, the browser 115, 130 reaches out to the shopping cart application 155, using an agreed-upon handshake. The handshake lets the shopping cart application 155 know that it is a legitimate transaction, regardless of the particular identity of the underlying user. The handshake signals to the shopping cart application 155 that the browser 115, 130 will stand behind the transaction and that any indication of payment is, indeed, a promise of payment that will be fulfilled. Further in this example, the embodiment may omit passing sensitive customer information (e.g., customer legal name and account number) between the browser 115, 130 and the shopping cart application 155 because the promise to pay can be trusted, thereby eliminating or reducing any utility of passing such sensitive information that may have been previously required to the shopping cart application 155. This may be an advantage over current electronic transaction techniques that require and pass sensitive customer information to a merchant or shopping cart.

Browser server 130 also includes encryption and blockchain module 214. A function of the encryption and blockchain module 214 is to be a secure vault that encrypts and stores the user's secure identity and payment information. Examples include the user's full legal name, birth date, account numbers associated with funding cards as well as their expiration dates and security codes, bank account numbers, and any other appropriate information that may be suited to secure storage. Encryption and blockchain module 214 may then encrypt that data using authenticating data from the user. Examples may include a PIN and a fingerprint, iris scan, and the like. For instance, the PIN may be used as a code, and the biometric data may include data points that themselves may also be used as a code. When combined, the PIN and the data points from the biometric data may then be used to encrypt the user identity and payment information.

Figure 3A:
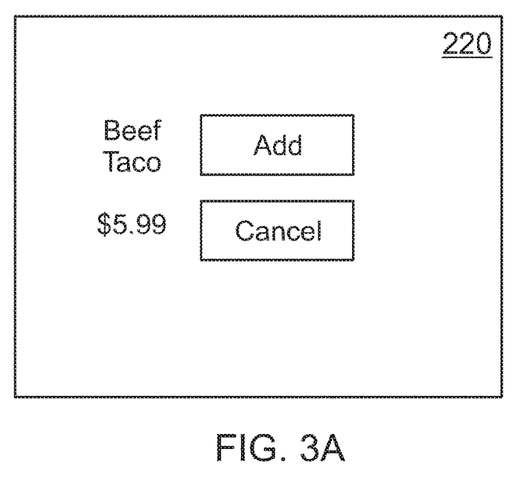
FIGS. 3A-3C are illustrations of an example user interface associated with the browser of FIG. 1, according to one embodiment.
Figure 3B:
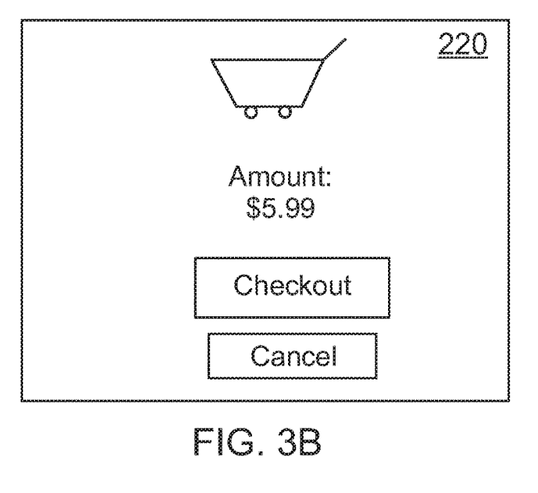
Figure 3C:
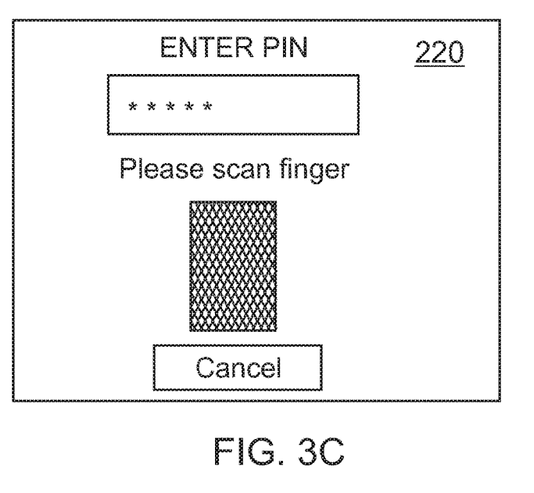
Figure 7:
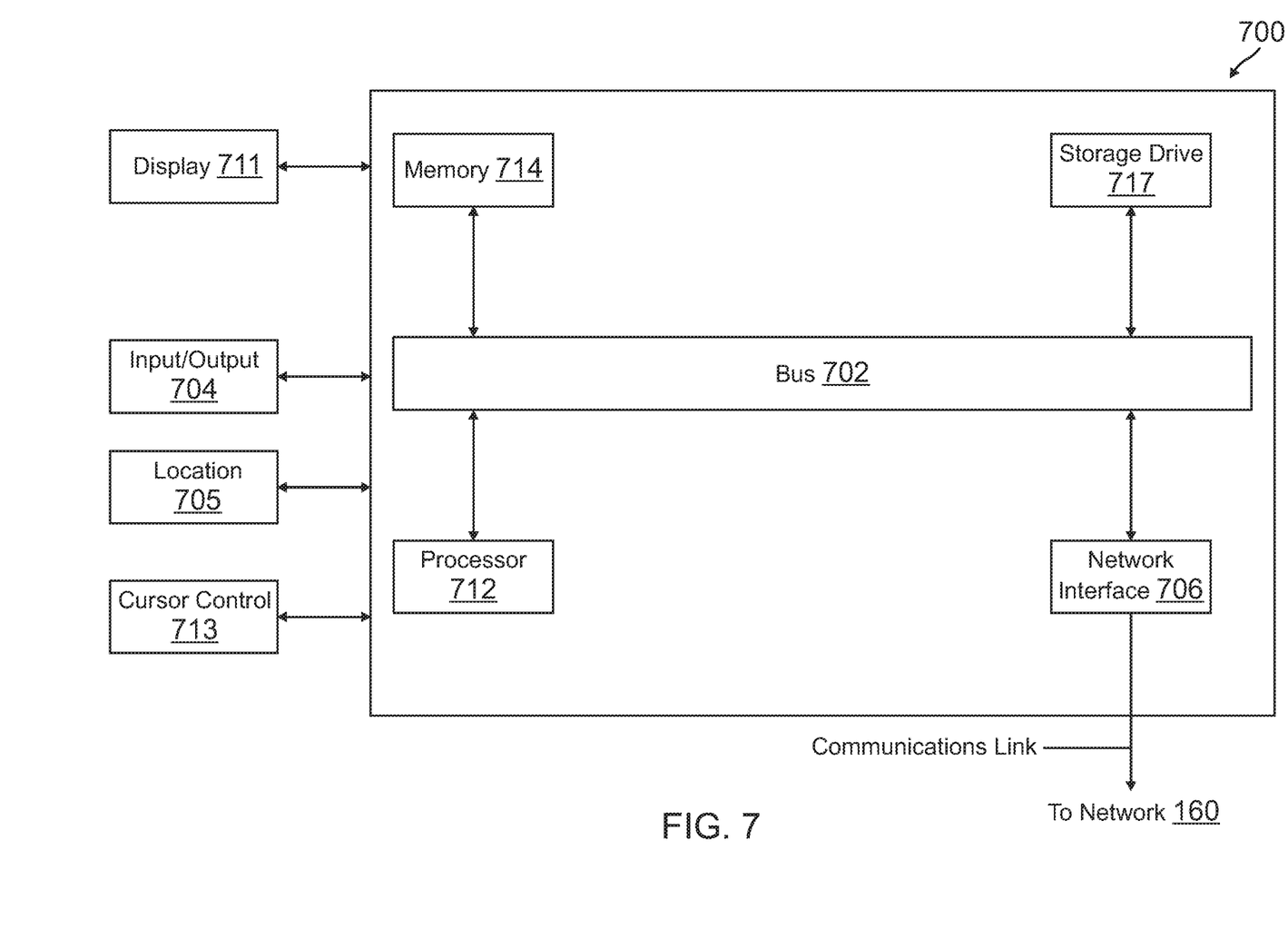
FIG. 7 is a block diagram of a computer system suitable for implementing one or more components in FIG. 1 according to one embodiment.

In one example, the encryption and blockchain module 214 stores the secure user data (the encrypted identity and payment information) in nonvolatile memory of the browser server 130, such as illustrated by storage drive 717 of FIG. 7. An example transaction is illustrated by FIGS. 3A-3C. At FIG. 3A, the user 105 is visiting a merchant website to purchase food and interacting with GUI 220. The user selects "Add" to choose a taco for $5.99. This brings the user 105 to a screen shown in FIG. 3B, which indicates that the taco has been added to the shopping cart. The user 105 may select "checkout". When the user desires to make a payment or to provide access to the secure user data, encryption and blockchain module 214 may then prompt the user to enter the PIN and the biometric data. For example, FIG. 3C shows GUI 220 of browser client application 115 prompting user 105 to enter a PIN and scan a finger on the display screen in response to the user 105 selecting "checkout" in FIG. 3B. Of course, GUI 220 of FIG. 3C is an example, and other interfaces could be used in other embodiments. Similarly, other biometric scanners, such as cameras, may be used to capture different types of biometric data in other embodiments.

Once the PIN and biometric data are input and transmitted to browser server 130, encryption and blockchain module 214 attempts to decrypt the encrypted secure user data. If the decryption is successful, that indicates valid input from the user, which will act as authorization by the user to move forward with either a transaction or to provide access to the secure user data.

Different embodiments may provide different methods and techniques for encryption. For instance, some embodiments may allow for a layered security that provides a higher security level to more sensitive data and a lower security level to less sensitive data. For instance, if a particular access is only made to a user's name or address (i.e., less sensitive information), the encryption and blockchain module 214 may provide access with one or the other of the PIN or the biometric information. On the other hand, access to more sensitive data such as payment data or date of birth may then be accessed via the encryption blockchain module 214 by providing both the PIN and the biometric information. In fact, any level of security and any granularity of security appropriate for different scenarios may be implemented in various embodiments.

Encryption and blockchain module 214 also creates and stores a blockchain in this example embodiment. For instance, encryption and blockchain module 214 may store the encrypted secure user data in a first block and then build additional blocks of the blockchain onto that first block as transactions are performed, where each of the additional blocks represents a respective transaction. Further in this example, a transaction may include an electronic transaction that results in a purchase or maybe something simpler, such as a third party accessing secure user data. Examples of data that may be stored in a block of a blockchain for a respective transaction include transaction ID, date and time, shopping cart ID, merchant ID, an indication of how the data was accessed (e.g., by PIN and biometric), identification of a good or a service, financial instrument used, and ID of entity accessing user information. Of course, various embodiments may store any appropriate information into a block of a blockchain, and such information is merely one example.

Figure 4:
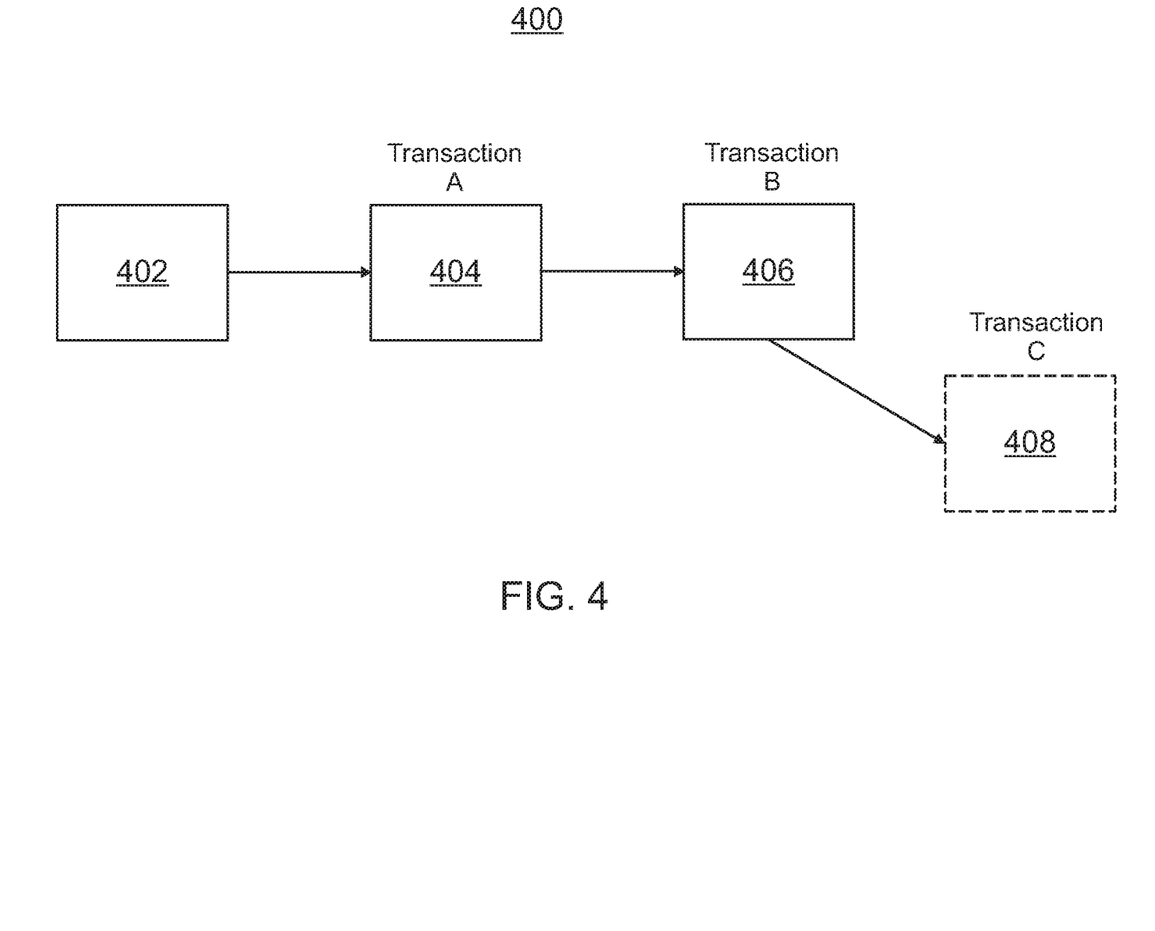
FIG. 4 is an illustration of an example blockchain for use with an identity-storing browser according to one embodiment.

An example blockchain 400 according to one embodiment is shown in FIG. 4. In this example, the first block 402 includes the encrypted secure user data. Block 404 is the next block, and it represents a transaction performed on behalf of the particular user by the browser 115, 130. In this example, the blockchain 400 is a permissioned blockchain, so that it is closed to entities that do not have a similar contractual and technical relationship or are otherwise authorized to access data in blockchain 400. For instance, in this example, the interested parties may be the user 105, the browser 115, 130 merchant server 140, and the shopping cart application 155. The legal and contractual relationship may also assume that each of the parties is assigned a private and public key pair, thereby allowing a given interested party to sign a block of the blockchain and to allow the other parties to verify signatures of the blocks.

The initial block 402 may include the encrypted secure user data, and the block 404 represents Transaction A. Specifically, in Transaction A, a hash value of the public key of an interested party (e.g., a shopping cart application used in Transaction A) and the previous transaction (in this case, block 402 does not represent a transaction, but can be used) was signed by another interested party (e.g., the user 105) using a private key.

Similarly, in Transaction B, a hash value of the public key of an interested party (e.g., a shopping cart application used in Transaction B) and block 404, was signed by an interested party (e.g., user 105) using a private key to create block 406. Again, in Transaction C, a hash value of the public key of an interested party (e.g., a shopping cart used in Transaction C) and block 406 was signed by an interested party (e.g., the user 105) using a private key to create block 408. Of course, that is just one example, as the blocks 402-408 may be constructed in any appropriate manner so long as it conforms to the particular rules defined by the contractual relationship among the interested parties. Further in this example, block 408 represents a side chain to the primary chain of blocks. The existence of the side chain in block 408 illustrates that some transactions may have multiple steps and may take time to complete. In the present example, block 408 is constructed before Transaction C is complete. Once the Transaction C is complete, block 408 may be made a permanent part of the primary chain. On the other hand, if Transaction C is abandoned before completion, then block 408 may be deleted.

In this case, any of the interested parties may perform an audit by checking the signatures in the blockchains and working backwards from a most recent block (e.g., block 408) to an oldest block (e.g., block 402). This illustrates the concept of the "permissioned" blockchain, wherein the interested parties must have permission to interact with the blockchain, so only interested parties that are trusted or relevant to a transaction may interact with the blockchain 400. In this example, the interested parties are defined by the contractual relationship.

Returning to FIG. 2, shopping cart interaction module 210 and payment services module 216 include functionality to interface with the merchant server 140, shopping cart application 155, acquirer host 165, and payment network 172 to facilitate a transaction during any given stage of the transaction. For instance, when the user 105 selects the "checkout" button, shopping cart interaction module 210 then transmits an indication of payment to the shopping cart application 155.

In this example, the user does may not enter any payment information or transmit any payment information to the shopping cart application 155, as the indication of payment suffices. Payment services module 216 then debits the user's account and credits the shopping cart (or merchant account) for the amount of the purchase, thereby acting as a payment provider. Payment services module 216 may also give information to the merchant server 140, such as user's name, user's phone number, user's location, or the like to then facilitate delivery or handling.

It should be noted that the division of functions between browser client application 115 and browser server 130 may be different in other embodiments. Specifically, various embodiments may distribute the functionality between client and server according to any appropriate criteria or application needs or resources. For instance, as storage, memory, processing power, and network bandwidth at handheld devices increases, some or all of the modules 210, 214, 216, and 218 may be implemented at user mobile device 110. However, in some embodiments, the processing and storage needs associated with encryption and block chain module 214 may weigh in favor of keeping at least block chain storage and processing at a server center.

Figure 5:
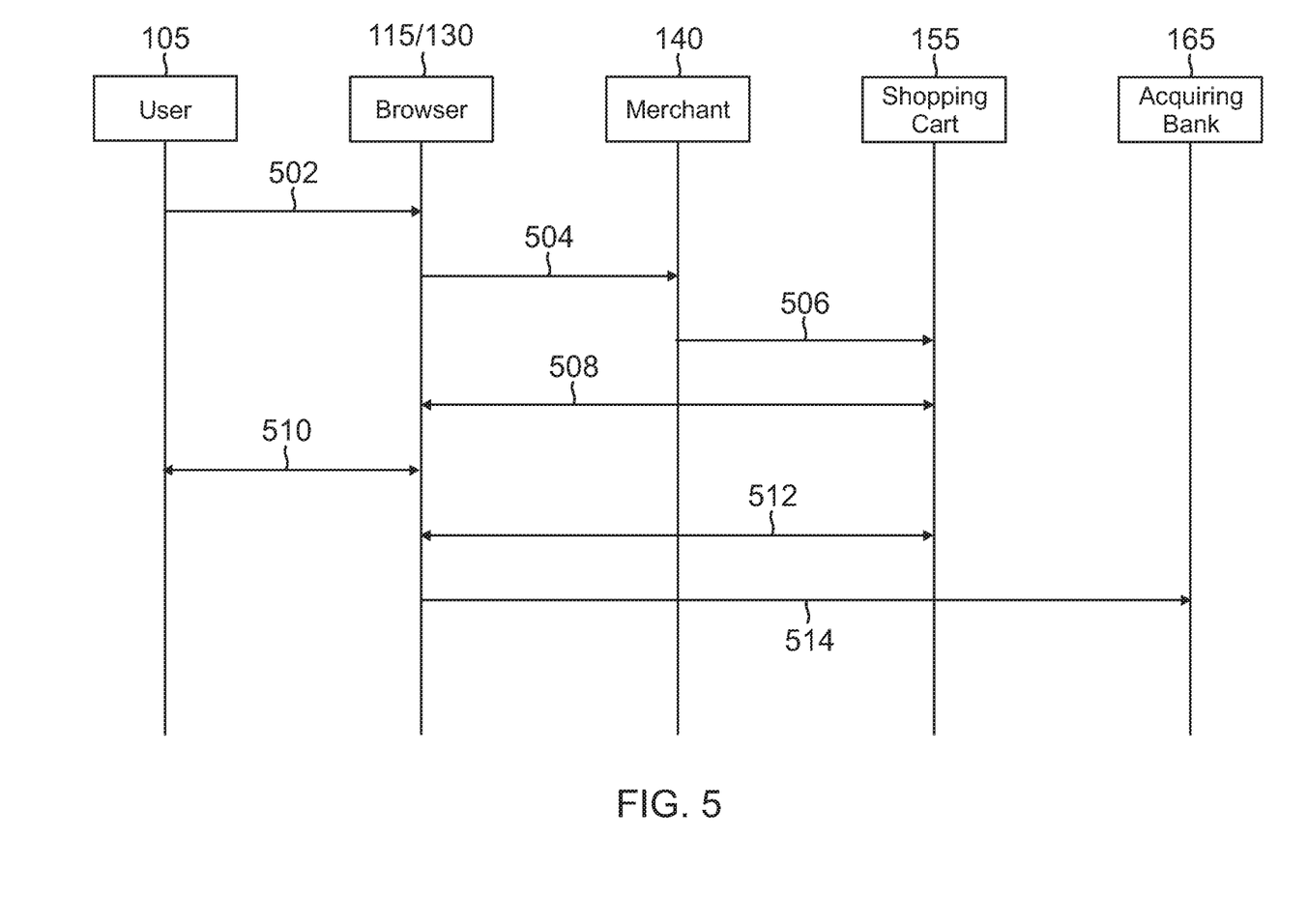
FIG. 5 is a signal diagram showing example communications among interested parties of the transaction, according to one embodiment.

FIG. 5 is an example signal diagram to illustrate relationships among the various parties to a transaction, according to one embodiment. At action 502, the user 105 interacts with browser 115 to begin a transaction. For example, the user selects a hyperlink or may type in a web address associated with merchant 140 in order to begin a transaction with merchant 140. At action 504, browser 115, 130 interacts with a marketplace application of the merchant 140 to allow the user 105 to view items and services for purchase and to identify items to purchase. At action 506, the marketplace application of the merchant 140 communicates the identified items to the shopping cart application 155 to begin the payment process.

At action 508, the shopping cart application 155 and the browser 115, 130 perform a secure handshake, thereby identifying each other as trusted entities. At this time or at a later time, the browser 115, 130 may send a "create sale" message to the shopping cart 155. Browser 115 then interacts with user 105 to receive user-authenticating data from the user via a user interface of the mobile device at action 510. For instance, the user may type in a PIN and submit biometric information using the user interface of the mobile device. With that information input, the browser 115, 130 then authenticates the user by attempting to decrypt the secure user data that is stored to the computing device. In an example where authentication fails, the actions of FIG. 5 may then cease, or the user may be given one or more attempts to provide the user-authenticating data.

Assuming that the user is properly authenticated, browser 115, 130 then provides an indication of payment to the shopping cart application 155. The indication of payment may include any appropriate message, such as an identification of the transaction itself, a date and time, and amount of the transaction, and a customer ID. However, various embodiments may provide any appropriate indication of payment. Of note in this example is that the browser 115, 130 may omit providing any secure payment information, or even an indication of the legal identity of the customer, to the shopping cart 155. An advantage of such an embodiment is that it may leverage the trusted relationship between the shopping cart application 155 and the browser 115, 130 to provide extra security to the consumer by avoiding transmitting secure consumer data at action 512. Additionally, the shopping cart application 155 is protected as well because the agreed upon protocols include authentication of the user 105 and a contractual relationship with browser 115, 130, thereby ensuring payment to the shopping cart 155.

As the transaction is progressing, browser 115, 130 builds a new block on the blockchain, using a hash from the previous block and being signed by the user and perhaps one or more other interested parties, such as the shopping cart application 155. Before the transaction is complete, the new block may be in a side chain. Once the transaction completes, the new block may be made permanent on the primary chain.

Continuing with the example, browser 115, 130 then credits the merchant (or the shopping cart 155) and debits user 105. Browser 115 may then provide payment in any of a number of ways. For instance, the browser 115, 130 may batch a number of transactions together and then process them all at once. Alternatively, the browser 115, 130 may process transactions continually or as triggered by a current transaction. In any event, one way that payment may be made is that browser 115, 130 may transmit transaction information (e.g., a transaction ID, amount, date and time, etc.) and payment information (e.g., merchant ID, payment information of the user 105, etc.) to the acquirer host 165 at action 514. Acquirer host 165 may then coordinate with issuer host 168 to make payment to an account associated with the merchant. In another embodiment, browser 115, 130 may transmit transaction and payment information to payment network 172, where payment network 172 then interfaces with acquirer host 165 and issuer host 168 to make payment.

Figure 6:
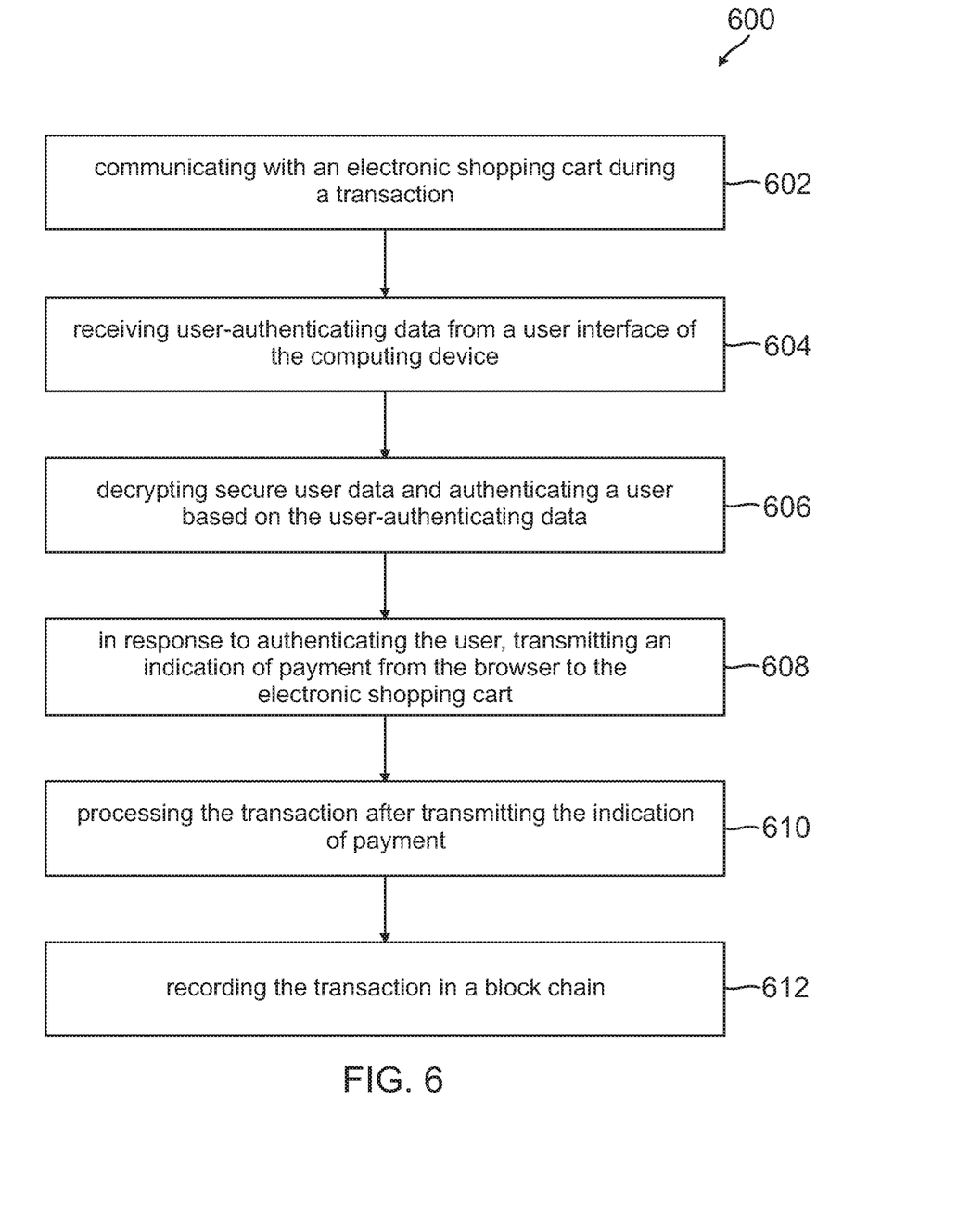
FIG. 6 is an illustration of an example method performed by an identity-storing browser according to one embodiment.

FIG. 6 is an illustration of example method 600 for facilitating a transaction, according to one embodiment. Method 600 may be performed by a browser (e.g., such as browser 115, 130) and, specifically, by a processor of the browser server 130 or mobile device 110 as it executes computer code to provide functionality described herein.

At action 602, the browser communicates with an electronic shopping cart during a transaction. For example, action 602 may include a secure handshake, wherein the browser and the shopping cart application identify each other and recognize that they both have a pre-established contractual and technical relationship. For instance, the browser and the shopping cart application may have a plurality of defined APIs and messages that they can use in the handshake and further during subsequent actions of the electronic transaction. Additionally, the contractual relationship assures the shopping cart application that payment will be made and that the browser authenticates the user. An example is shown at action 508 of FIG. 5.

Action 602 may also include user-directed actions with respect to the shopping cart, such as identifying items or services for purchase and placing them in the shopping cart. The user may also be prompted to pay for the transaction, such as described above with respect to FIG. 3B. However, in this example, before payment is made or the transaction is completed, the browser authenticates the user, as described with respect to actions 604, 606.

At action 604, the browser receives user-authenticating data from a user interface of the computing device. For instance, sometime during the transaction, the browser may prompt the user to enter user-authenticating data, such as a PIN, biometric information, and the like in order to authenticate the user. An example is described above with respect to FIG. 3A. Further, as noted above, a layered authentication may be used, with less verification used for less-sensitive information, and more verification used for more sensitive information. An example is shown at action 510 of FIG. 5.

At action 606, the browser decrypts secure user data and authenticates the user based on the user-authenticating data. In one example embodiment, the secure user data is stored and encrypted on the user device itself, such as storage drive 717 of FIG. 7 (described further below). In continuing with the example, the encrypted user data may be stored in a block of the blockchain, such as the blockchain 400 of FIG. 4.

In any event, the browser decrypts the secure user data using, at least in part, the user-authenticating data. For instance, the PIN and biometric data may provide data that can be used as a key to decrypt and encrypt the secure user data. Assuming that valid user-authenticating data is entered, the browser 115, 130 would then successfully decrypt the data, thereby authenticating the user. If the user-authenticating data is invalid or is incorrectly entered, then decryption would not happen, and the user would not be authenticated in this example.

At action 608, the browser transmits an indication of payment to the electronic shopping cart in response to authenticating the user. As discussed above, the user interface on the mobile device (e.g., as in FIG. 3B) may allow the user to select a payment option while omitting entry of user account information into the shopping cart. Rather, various embodiments may instead provide a message or token from the browser to the shopping cart application to indicate that payment will be made. The message or token may include any appropriate information, such as purchase price, date and time, user identifier, browser identifier, and the like. An advantage of such an embodiment is that the prior contractual relationship, user verification, and use of a message or token for payment allows the user to avoid entering sensitive payment information (e.g., account numbers) for some or all transactions. This may increase convenience for the user as well as security for the user. Furthermore, the shopping cart application is assured of payment because of the contractual relationship and despite not receiving user account numbers.

At action 610, the browser processes the transaction after transmitting the indication of payment. For instance, the browser may batch this transaction with other transactions for processing at a later time or may process this transaction at any appropriate time. In one example, action 610 may include the browser debiting the user and crediting the merchant or shopping cart for the transaction amount in an internal record of the browser. In one example, the browser may transmit transaction and payment information to the financial entities such as an acquiring bank to cause the acquiring bank to request payment from an issuing bank. An example is shown above at action 514 of FIG. 5. In another example, the browser may provide payment information to a payment network, such as payment network 172 of FIG. 1 to cause payment.

At action 612, the browser records the transaction in a blockchain stored on the computing device. As a transaction progresses, the browser may build the block in a side chain, and as the transaction completes, the browser may make the block a permanent part of the primary chain. Examples of data that may be stored in the blockchain to represent the particular transaction include transaction ID, date and time, identification of the interested parties (the shopping cart, the merchant, user ID) an indication of how the data was accessed (e.g., biometric data plus PIN), identification of the particular item that is purchased, payment instrument used, and the like.

The scope of embodiments is not limited to the particular series of actions depicted in FIG. 6. Rather, various embodiments may add, omit, rearrange, or modify the actions. For instance, the timing of user authentication may be placed at any appropriate point, such as at opening of the browser, beginning of a transaction, at the time of payment, or other appropriate time.

Other examples may also include auditing the blockchain. For instance, a user authenticated by the system may use the system-generated public keys to verify the signatures and hashes in the blocks. Also, since a block is used to store transaction data, various embodiments may include extracting the data from the block to send to a financial entity to cause transfer of funds, such as in action 514 of FIG. 5 and action 610 of FIG. 6.

FIG. 7, an embodiment of a computer system 700 suitable for implementing, for example, the computing devices 110, 130, 140, 165, 168, and 172 of FIG. 1 discussed above. It should be appreciated that other devices utilized in the system discussed above may be implemented as the computer system 700 in a manner as follows.

In accordance with various embodiments of the present disclosure, computer system 700, such as a smart phone, computer, and/or a network server, includes a bus 702 or other communication mechanism for communicating information, which interconnects subsystems and components, such as a processing component 712 (e.g., processor, microcontroller, digital signal processor (DSP), etc.), a system memory component 714 (e.g., RAM) a storage drive component 717 (e.g., solid-state, hard drive, or optical), a network interface component 706 (e.g., wireless card, modem, or Ethernet card), a display component 711 (e.g., a touchscreen, CRT, or LCD), an input/output component 704 (e.g., keyboard, keypad, a touchscreen), a cursor control component 713 (e.g., mouse, pointer, or trackball), and/or a location determination component 705 (e.g., a Global Positioning System (GPS) device as illustrated, a cell tower triangulation device, and/or a variety of other location determination devices known in the art). In one implementation, the storage drive component 717 may comprise a database having one or more storage drive components.

In accordance with embodiments of the present disclosure, the computer system 700 performs specific operations by the processor 712 executing one or more sequences of instructions contained in the memory component 714, such as described herein with respect to FIGS. 1-6 discussed above. Such instructions may be read into the system memory component 714 from another computer readable medium, such as storage drive 717. In other embodiments, hard-wired circuitry may be used in place of or in combination with software instructions to implement the present disclosure.

Logic may be encoded in a computer readable medium, which may refer to any tangible and non-transitory medium that participates in providing instructions to the processor 712 for execution. Such a medium may take many forms, including but not limited to, non-volatile media and volatile media. In various implementations, non-volatile media includes hard drive or solid state drives, such as the storage drive component 717, and volatile media includes dynamic memory, such as the system memory component 714. Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of the computer systems 700 coupled by a communication link 718 to the network 160 (e.g., such as a LAN, WLAN, PTSN, and/or various other wired or wireless networks, including telecommunications, mobile, and cellular phone networks) may perform instruction sequences to practice the present disclosure in coordination with one another.

The computer system 700 may transmit and receive messages, data, information and instructions, including one or more programs (i.e., application code) through the communication link 718 and the network interface component 706. The network interface component 706 may include an antenna, either separate or integrated, to enable transmission and reception via the communication link 718. Received program code may be executed by processor 712 as received and/or stored in storage drive component 717 or some other non-volatile storage component for execution.

The present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure.

Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method performed by a browser server including conveying an indication of a payment instead of a payment instrument of a user to a merchant server during a transaction between a computing device of the user and the merchant server over a network, comprising:

receiving, by the browser server, the payment instrument of the user from the computing device;

performing, by the browser server, a secure handshake with an electronic shopping cart on the merchant server over the network;

receiving, by the browser server from a browser client application of the computing device, user-authenticating data;

retrieving, by the browser server from the computing device, encrypted secure user data;

decrypting, by the browser server, the retrieved encrypted secure user data using the user-authenticating data;

authenticating, by the browser server, the user based on the user-authenticating data and the decrypted secure user data;

in response to authenticating the user, transmitting, by the browser server, the indication of the payment to the electronic shopping cart;
processing, by the browser server, the transaction using the payment instrument of the user after transmitting the indication of the payment; and
recording, by the browser server, the transaction in a blockchain in the computing device including the payment instrument of the user.

2. The method of claim 1, further comprising, prior to the retrieving the encrypted secure user data:
encrypting, by the browser client application, the secure user data; and
storing, by the browser client application, the encrypted secure user data on the computing device.

3. The method of claim 2, further comprising: storing, by the browser server, the encrypted secure user data in a block of the blockchain.

4. The method of claim 1, wherein recording the transaction in the blockchain comprises:
generating a block of the blockchain including the payment instrument, an identification of the transaction and an identification of the electronic shopping cart; and
encrypting the block using a key associated with the browser server.

5. The method of claim 1, wherein receiving the user-authenticating data comprises:
receiving biometric data or a personal identification number (PIN) from the browser client application of the computing device.

6. The method of claim 1, wherein processing the transaction comprises:
transmitting an identification of the transaction and at least a portion of the decrypted secure user data to a financial entity.

7. The method of claim 1, wherein transmitting the indication of the payment includes displaying, by the browser client application of the computing device of the user, a selectable payment option, the user interface omitting entry of user account information into the electronic shopping cart.

8. The method of claim 1, wherein recording the transaction in the blockchain comprises:
recording the transaction in a side chain of the blockchain during the transaction;
determining that the transaction has been completed; and
adding the side chain to the blockchain in response to the determining that the transaction has been completed.

9. A system, comprising:
one or more hardware processors; and
a non-transitory memory storing instructions that, when executed by the one or more hardware processors, cause the one or more hardware processors to perform a method including conveying an indication of a payment instead of a payment instrument of a user to a merchant server during a transaction between a computing device of the user and the merchant server over a network, the method comprising:
receiving the payment instrument of the user from the computing device;
performing a secure handshake with an electronic shopping cart on the merchant server over the network;
receiving user-authenticating data from a browser client application of the computing device;
retrieving encrypted secure user data from the computing device;
decrypting the retrieved encrypted secure user data using user-authenticating data;
authenticating the user based on the user-authenticating data and the decrypted secure user data;
in response to authenticating the user, transmitting the indication of the payment to the electronic shopping cart;
processing the transaction using the payment instrument of the user after transmitting the indication of the payment; and
recording the transaction in a blockchain in the computing device including the payment instrument of the user.

10. The system of claim 9, wherein the instructions, when executed by the one or more hardware processors, further causes the one or more hardware processors to further perform the method of: storing the encrypted secure user data in a block of the blockchain.

11. The system of claim 9, wherein the recording the transaction in the blockchain comprises:
generating a block of the blockchain, including an identification of the transaction and an identification of the electronic shopping cart; and
encrypting the block using a key associated with the browser.

12. The system of claim 9, wherein the receiving the user-authenticating data further comprises:
receiving biometric data or a personal identification number (PIN) from the browser client application of the computing device.

13. The system of claim 9, wherein the processing the transaction further comprises:
transmitting an identification of the transaction and at least a portion of the decrypted encrypted secure user data to a financial entity.

14. The system of claim 9, wherein the recording the transaction in the blockchain further comprises:
recording the transaction in a side chain of the blockchain during the transaction;
determining that the transaction has been completed; and
adding the side chain to the blockchain in response to the determining that the transaction has been completed.

15. A non-transitory machine-readable medium having stored thereon machine-readable instructions that, when executed, cause one or more hardware processors to perform a method including conveying an indication of a payment instead of a payment instrument of a user to a merchant server during a transaction between a computing device of the user and the merchant server over a network, the method comprising:
receiving the payment instrument of the user from the computing device;
performing a secure handshake with an electronic shopping cart on the merchant server over the network;
receiving user-authenticating data from a browser client application of the computing device;
retrieving encrypted secure user data from the computing device;
decrypting the retrieved encrypted secure user data from the computing device;
authenticating the user based on the user-authenticating data and the decrypted secure user data;
in response to authenticating the user, transmitting the indication of the payment to the electronic shopping cart;

processing the transaction using the payment instrument of the user after transmitting the indication of the payment; and recording the transaction in a blockchain in the computing device including the payment instrument of the user.

\* \* \* \* \*